United States Patent [19]

Smith et al.

[11] Patent Number: 5,008,163
[45] Date of Patent: Apr. 16, 1991

[54] CONDUCTIVE CERAMIC COMPOSITION AND METHOD OF PREPARATION

[75] Inventors: James L. Smith, Lemont; Eugenia H. Kucera, Downers Grove, both of Ill.

[73] Assignee: The United States of America as represented by the United States Department of Energy, Washington, D.C.

[21] Appl. No.: 357,247

[22] Filed: May 26, 1989

[51] Int. Cl.$^5$ .................. H01M 4/88; H01M 4/90
[52] U.S. Cl. .................................. 429/40; 501/134; 502/101; 423/598; 423/599; 423/641; 252/518; 252/519; 252/520
[58] Field of Search .................. 423/598, 599, 641; 502/101; 429/40; 252/518-521; 501/134

[56] References Cited

U.S. PATENT DOCUMENTS

| | | | |
|---|---|---|---|
| 3,507,701 | 4/1970 | Broyde | 429/40 X |
| 4,026,811 | 5/1977 | Readey et al. | 423/598 X |
| 4,132,619 | 1/1979 | Klein et al. | 502/101 X |
| 4,525,768 | 6/1985 | Wheeler | 252/521 X |
| 4,567,031 | 1/1986 | Riley | 423/599 X |
| 4,670,815 | 6/1987 | Alexander et al. | 252/521 X |

Primary Examiner—Stephen J. Kalafut
Attorney, Agent, or Firm—Mark P. Dvorscak; Hugh W. Glenn; William R. Moser

[57] ABSTRACT

A ceramic anode composition is formed of a multivalent metal oxide or oxygenate such as an alkali metal, transition metal oxygenate. The anode is prepared as a non-stoichiometric crystalline structure by reaction and conditioning in a hydrogen gas cover containing minor proportions of carbon dioxide and water vapor. The structure exhibits a single phase and substantially enhanced electrical conductivity over that of the corresponding stoichiometric structure. Unexpectedly, such oxides and oxygenates are found to be stable in the reducing anode fuel gas of a molten carbonate fuel cell.

16 Claims, 3 Drawing Sheets

CONDUCTIVE CERAMIC COMPOSITION AND METHOD OF PREPARATION

CONTRACTUAL ORIGIN OF THE INVENTION

The United States Government has rights in this invention pursuant to Contract No. W-31-109-ENG-38 between the U.S. Department of Energy and University of Chicago.

BACKGROUND OF THE INVENTION

This invention relates to ceramic compositions having chemical stability and electronic conductivity at elevated temperatures. In particular, it relates to ceramic anode compositions for use in molten carbonate fuel cells and to compositions for use in other reducing environments at elevated temperatures.

Previous molten carbonate fuel cells have included an anode of such as porous nickel, a cathode of such as porous lithiated nickel oxide and molten carbonate as electrolyte retained in a porous tile. A representative electrolyte is a mixture of $Li_2CO_3$ and $K_2CO_3$. Typical operating temperatures of such molten carbonate fuel cells are between 600°-700° C. and at such elevated temperatures there has been loss of physical stability of the anode structure over extended periods of operation.

Nickel metal as anode material is chemically, but not mechanically stable. A porous nickel anode will creep at the cell operating temperature and the required mechanical loading resulting in reduced porosity. This problem has been addressed by alloying the nickel with chromium or aluminum, for creep resistance but with accompanying increased cost and effort in anode preparation. Other efforts have involved plating ceramic particles with nickel to provide a hard core. Unfortunately, the nickel plating tends not to wet the ceramic and to coalesce into islands of nickel on otherwise uncoated particles.

The present inventors, jointly with Sim, have reported stable, electronically conductive ceramic cathode compositions in U.S. Pat. No. 4,564,567. These compositions involved lithium-transition metal oxygenates with suitable dopants to increase their electrical conductivity to a level for molten carbonate cathode use. At that time, the inventors did not contemplate the use of such ceramic oxygenates as anode materials because the highly reducing fuel gas in contact with the anode was expected to significantly change and structurally degrade such ceramics. In fact, efforts to sinter particulate $LiFeO_2$ in hydrogen gas at about 1000° C. reduced the ceramic to iron metal which is not chemically stable in the molten alkali metal carbonate fuel cell.

Therefore, in view of the above, it is an object of the present invention to provide an electrically conductive ceramic composition that is stable in fuel gas environments.

It is a further object to provide a ceramic anode composition that is physically and chemically stable in fuel gases and molten alkali metal carbonates at elevated temperatures.

It is a further object to provide an improved method of preparing an anode or other electrical component of high temperature, electrically conductive ceramic.

It is a further object to provide a method of preparing an anode for use in a molten carbonate fuel cell with improved electrical conductivity not dependent on the addition of a doping additive.

SUMMARY OF THE INVENTION

In accordance with the present invention, a ceramic composition is provided, including a multivalent metal oxide with the ratio of oxygen to multivalent metal in non-stoichiometric relation, being deficient in oxygen and exhibiting an electrical conductivity substantially greater than the electrical conductivity of the corresponding stoichiometric composition with balanced oxygen. The composition has been found to be chemically stable in the fuel gas and molten alkali metal carbonate suitable for use in a fuel cell.

In more particular aspects of the invention, the composition is selected from the non-stoichiometric, oxygen deficient variants of the nominally stoichiometric ceramics consisting of $LiFeO_2$, $Li_3VO_4$, $Li_3TaO_4$, $Li_3NbO_4$, $Li_2TiO_3$, $Li_2ZrO_3$, MnO, and $CeO_2$, which compositions exhibit enhanced electrical conductivity. Where the composition is a variant of $LiFeO_2$, it is characterized by a lattice constant of more than that of stoichiometric $LiFeO_2$ (i.e. 4.158 angstroms) but, no more than about 4.2 angstroms determined by x-ray diffraction and further characterized by electrical conductivity of more than 0.003 $(ohm-cm)^{-1}$ at about 700° C.

One other contemplation of the invention involves an anode composition including $A_xT_yO_z$: where A is an alkali metal, T is a transition metal, and O is oxygen, with x, y, and z in non-stoichiometric relation, deficient in oxygen and exhibiting substantially greater electrical conductivity than a corresponding stoichiometric composition.

In one other aspect of the invention, a method of preparing a ceramic composition is provided, including providing a transition metal oxide of near stoichiometric proportions and exposing the oxide to a reducing gas modified with sufficient oxygen potential to prevent reduction of the oxide to the transition metal but of sufficient reductive potential to convert a portion of the transition metal species to a lower valence state than that required in the stoichiometric composition.

In more specific aspects of this method, the reducing gas includes a major portion of hydrogen modified by lesser portions of carbon dioxide and water vapor to provide carbon dioxide and oxygen potential sufficient to prevent or minimize lithium loss and reduction of the transition metal oxide to elemental transition metal.

DETAILED DESCRIPTION OF THE DRAWINGS

The present invention is illustrated in the accompanying drawings wherein.

DETAILED DESCRIPTION OF THE PREFERRED EMBODIMENT

Figure 1:
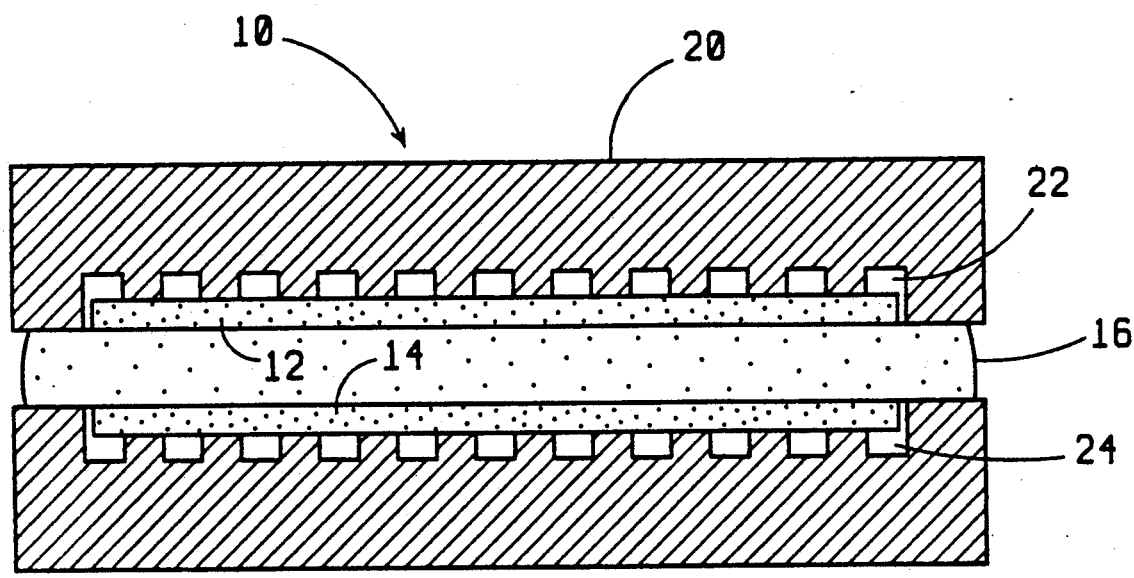
FIG. 1 is a cross-sectional schematic view of a molten carbonate fuel cell.

FIG. 1 provides an illustration of the representative fuel cell incorporating one embodiment of the invention. As illustrated, fuel cell 10 includes a porous cathode 12 and a porous anode 14 of the ceramic anode composition described herein. The electrodes are separated by tile 16 containing a mixture of $Li_2CO_3$ and $K_2CO_3$. Typically, the anode 14 and cathode 12 have a dual porosity provided by pores of about 10-150 microns and 10 micropores from submicron up to about 5 microns diameter. The pores of the tile 16 are generally less than about 3 microns in diameter. Representative thicknesses for the cathode 12, anode 14 and tile 16 are about 0.04, 0.07 and 0.05-0.13 cm. respectively. These components are typically held in a stainless steel housing 20 provided with slots 22 and 24 for carrying oxidant gas and fuel gas to the cathode and anode respectively.

The anode compositions and structures of this invention are prepared in a modified manner to that of the cathodes described in U.S. Pat. No. 4,564,567. Modifications as described below impart enhanced electrical conductivity and stability in the anode environment. Preferably, the anode is prepared with dual porosity as is described in U.S. patent application Ser. No. 260,837 filed Oct. 21, 1988, on behalf of the Inventors. This U.S. Pat. No. 4,564,567 and application Ser. No. 260,837 are incorporated by reference herein for the purpose of describing electrode materials and electrode preparation methods.

The ceramic anode composition is selected from the oxides of the multivalent metals such as the transition metals, the lanthanides and the transuranic elements. Preferably the transition metal ceramics are selected in view of the cost and the handling problems encountered with the latter identified series. Alkali metal-transition metal oxygenates are contemplated as suitable for use. Such anode compositions can be defined by the formula:

$$A_xT_yO_z$$

where:
A is an alkali metal
T is a transition metal and
O is oxygen
and x, y, and z are in non-stoichiometric relation deficient in oxygen.

Various transition metal oxides and oxygenates have been identified as stable in molten alkali metal carbonates but were not previously considered for anode use because it was believed they would be unstable in the fuel gas environment. The inventors have discovered ceramic compositions that are chemically stable in the anode gas. These compositions can be prepared in a reducing gas atmosphere biased by the presence of an oxygen producing equilibrium. For example, the presence of minor proportions of $H_2O$ and $CO_2$ in a $H_2$ gas blanket can limit lithium loss and prevent the complete reduction of many ceramic compositions previously considered unsuitable for use.

Consistent with the inventors' discovery, anode compositions can be selected for use from oxides and oxygenates of transition metals including $LiFeO_2$, $Li_3VO_4$, $Li_3TaO_4$, $Li_2ZrO_3$, $Li_3NbO_4$, $Li_2TiO_3$, $MnO$ and $CeO_2$. These ceramic anode materials, particularly $LiFeO_2$, when prepared as described have a crystalline structure substantially different from the near stoichiometric forms prepared for use in the cathode or in other oxidant environments. The structural differences are exhibited by differences in lattice constants measured by X-ray diffraction (XRD) and by non-stoichiometry determined by wet chemistry.

In the non-stoichiometric form, the transition metal exists substantially in more than one valence state and the oxygen and the alkali metal are slightly deficient in respect to the stoichiometric ratios. Merely by way of example, the non-stoichiometric composition—$Li_{0.61}$—$Fe^{3+}_{0.61}Fe^{2+}_{0.39}O_{1.61}$—was found to be a single phase crystalline structure, stable in the anode environment and of enhanced electrical conductivity. The inventors have found these non-stoichiometric ceramics to have electrical conductivities substantially above those of the corresponding near stoichiometric forms.

Figure 2A:
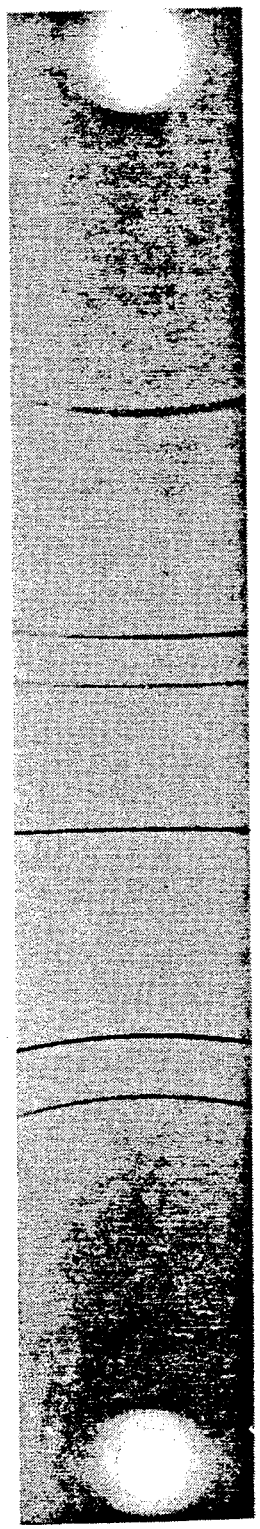
FIG. 2A is an X-ray diffraction pattern of a ceramic composition prepared in accord with the present invention.
Figure 2B:
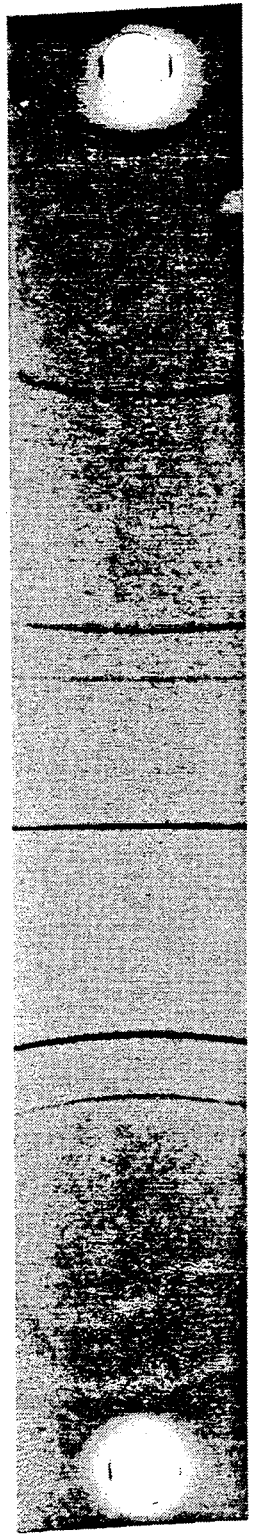
FIG. 2B is an X-ray diffraction pattern of a corresponding ceramic composition of near stoichiometric proportions.

FIG. 2A illustrates the differences in X-ray diffraction patterns of a non-stoichiometric composition over those of a near stoichiometric $LiFeO_2$ shown in FIG. 2B. Lattice constants for each of the compositions were calculated and determined by methods described in Azaroff and Buerger, *The Powder Method in x-ray crystallography*, chapters 1-8, (McGraw-Hill Book Co. Inc., 1958) and are given below in Table 1.

Table I illustrates differences in properties of the non-stoichiometric lithium-iron compositions as compared with the near stoichiometric form. The near stoichiometric form was prepared in an oxidant gas environment and has less than one mole percent variation in stoichiometric proportions. Its lattice constant agrees with that of stoichiometric $LiFeO_2$. The form containing $Fe^{3+}$ and $Fe^{4+}$ was prepared in air and would be substantially altered by exposure to the anode fuel gas.

TABLE I

| CERAMIC COMPOSITION (NOMINALLY) | LATTICE CONSTANT ANGSTROMS | ELECTRICAL CONDUCTIVITY $(OHM-CM.)^{-1}$ |
| --- | --- | --- |
| STOICHIOMETRIC | | |
| $LiFeO_2$ | 4.158 | 0.003 |
| NON-STOICHIOMETRIC | | |
| $Li(Fe^{3+} Fe^{4+})O_2$ | 4.156 | 0.3 |
| $Li(Fe^{3+} Fe^{2+})O_2$ | 4.162 to 4.2 | 3.0 |

It must be appreciated that even small changes in lattice constants can indicate large stoichiometric and electrical conductivity differences. For instance, the lattice constant for stoichiometric $LiFeO_2$ is 4.158 angstroms while a comparable non-stoichiometric anode material was found to have a lattice constant of 4.162 and enhanced electrical conductivity. In addition, $LiFeO_2$ prepared in air exhibits a lattice constant of 4.156, a non-stoichiometry of about 1-2 mole % $Fe^{4+}$ and an electrical conductivity of about 0.3 in the undoped condition.

Figure 3:
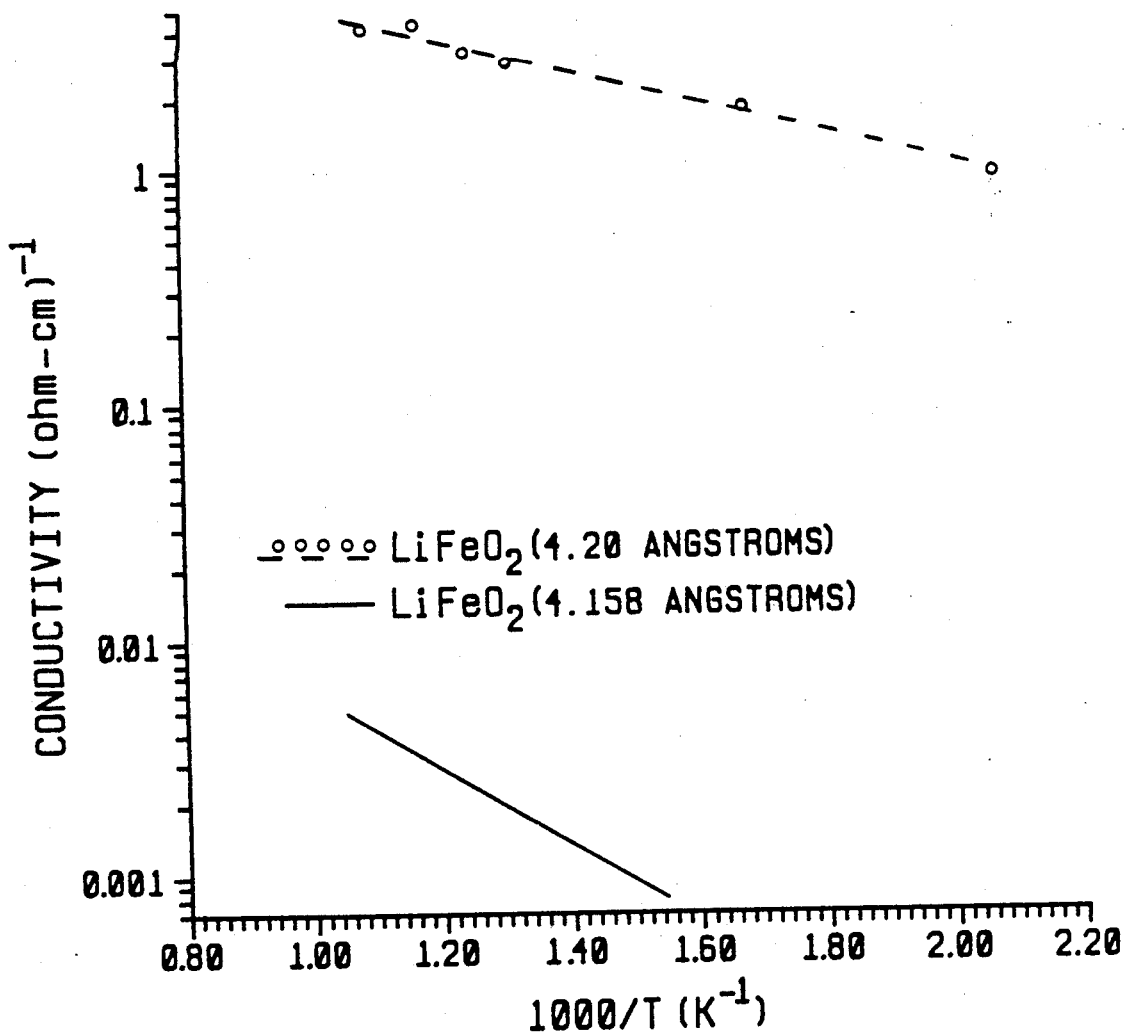
FIG. 3 is a graph of electrical conductivity vs inverse temperature for $LiFeO_2$, in a non-stoichiometric composition in comparison with that of a nearly stoichiometric composition.

FIG. 3 clearly illustrates the substantial improvement in electrical conductivity exhibited by the non-stoichiometric $LiFeO_2$ composition (lattice constant=4.2 angstroms) over that of the near stoichiometric composition (lattice constant=4.158). These changes in electrical conductivity are attributes of the inventive composition made possible by the present method of preparation.

In one manner of preparing the ceramic composition of the present invention, an oxide of the selected transition metal is provided in powdered form and conditioned by exposure to a reducing fuel gas for an extended period. The powder can be provided by various techniques as discussed in U.S. Pat. No. 4,564,567 for the preparation of cathodes. Optionally, dopant metals can be incorporated by mixing fine powders or by coprecipitating oxide affording compounds as small particles from solution. Other methods include spray and freeze drying and gel processes. The transition metal oxide can be formed and conditioned in the presence of a reducing gas containing a minor portion of carbon dioxide and water vapor.

Where an alkali metal-transition metal oxide is to be formed, the transition metal oxide powder is combined with an alkali metal carbonate at reaction conditions for an extended period, typically 650°–750° C. for 50–100 hours. The reaction can be conducted with a cover of a reducing fuel gas such as hydrogen including a minor portion of carbon dioxide to limit lithium loss and control reduction of the transition metal to a multivalent state short of the elemental transition metal. Although the dissociation equilibrium of carbon dioxide provides an oxygen presence, a minor portion of water vapor, e.g. at least 5 mol %, preferably is included to establish a supplemental oxygen producing equilibrium with the carbon dioxide for limiting transition metal reduction.

Through use of this procedure, non-stoichiometric lithium-iron oxides (nominally $LiFeO_2$) have been prepared with about 60–70 mol % $Fe^{3+}$ and 30–40 mol % $Fe^{2+}$. As seen in FIG. 3 and Table I above this composition can have an electrical conductivity a thousand times that of the undoped near stoichiometric $LiFeO_2$.

Following preparation and conditioning the non-stoichiometric composition in a reducing fuel gas, subsequent steps such as fiber formation, removal of binders and sintering for limited periods can be conducted in air provided such procedures are followed by exposure to the reducing fuel gas at reaction conditions to correct any shifts in lattice dimensions and non-stoichiometry.

The following example is provided to illustrate but is not intended to limit the scope of the invention as defined in the claims.

EXAMPLE I

An anode formed of non-stoichiometric $LiFeO_2$ was prepared by reacting an oxide of iron ($Fe_2O_3$) with stoichiometric $Li_2CO_3$ plus 50% wt. excess $K_2CO_3$-$Li_2CO_3$ at 700° C. in a fuel gas for 100 hours. The fuel gas contained about 20 mol % $CO_2$ and the balance $H_2$ with a minor portion of $H_2O$ provided by 60° C. water vapor. The resulting powder was made into fibers in accord with the method of U.S. patent application Ser. No. 260,837, tape cast and fired in air at 975° C. to form a porous body. The porous body was held for 100 hours at 700° C. in fuel gas with no loss of materials or integrity.

Although the invention has been described in terms of a ceramic anode composition for a molten carbonate fuel cell, it is likewise applicable to other ceramic compositions, components and devices that function under reducing conditions.

It is to be understood that the preferred embodiment of the invention has been disclosed and that various changes in the details may be made without departing from the spirit, or sacrificing any of the advantages of the present invention.

The embodiment of the invention in which an exclusive property or privilege is claimed is defined as follows:

1. A ceramic composition comprising a multivalent metal oxide, said metal oxide including an alkali metal-transition metal oxygenate, with the ratio of oxygen to multivalent metal in non-stoichiometric relation, deficient in oxygen and wherein the composition exhibits an electrical conductivity substantially greater than the electrical conductivity of a corresponding stoichiometric composition with balanced oxygen.

2. The composition of claim 1 wherein the composition is chemically stable in molten alkali metal carbonate.

3. A ceramic composition comprising a multivalent metal oxide with the ratio of oxygen to multivalent metal in non-stoichiometric relation, deficient in oxygen and wherein the composition exhibits an electrical conductivity substantially greater than the electrical conductivity of a corresponding stoichiometric composition with balanced oxygen, wherein the composition is selected from the group of non-stoichiometric, oxygen deficient variants of the nominally stoichiometric ceramics consisting of $LiFeO_2$, $Li_3VO_4$, $LiTaO_4$, $LiNbO_4$, $Li_2TiO_3$, $Li_2ZrO_3$, $MnO$, and $CeO_2$.

4. The composition of claim 3 wherein the composition is a non-stoichiometric variant of $LiFeO_2$.

5. The composition of claim 4 characterized by a lattice constant of more than 4.158 to about 4.2 angstroms and an electrical conductivity more than 0.003 $(ohm-cm)^{-1}$ at about 700° C.

6. The composition of claim 5 wherein the electrical conductivity is about 3 $(ohm-cm)^{-1}$.

7. The composition of claim 4 wherein Fe is present at about 30–40 mol % $Fe^{2+}$ and about 60–70 mol % $Fe^{3+}$.

8. A ceramic anode composition comprising:

$$A_xT_yO_z$$

where:
A is an alkali metal
T is a transition metal and
O is oxygen.
and x, y, and z are in non-stoichiometric relation deficient in oxygen,
the composition exhibiting substantially greater electrical conductivity than that of a corresponding stoichiometric composition.

9. The anode composition of claim 8 characterized by chemical stability in contact with molten alkali metal carbonate in a reducing gas environment.

10. The anode composition of claim 8 characterized by chemical stability in contact with a reducing gas including at least 50 mol % $H_2$, at least 20 mol % $CO_2$ humidified to at least 60° C. water vapor saturation.

11. A method of preparing an electrically conductive, non-stoichiometric ceramic composition comprising:
providing a transition metal oxide of near stoichiometric proportions;
exposing said oxide to a reducing gas modified with carbon dioxide to convert a portion of the transition metal species to a lower valence state than that required in the corresponding stoichiometric composition.

12. The method of claim 11 wherein the reducing gas includes a major portion of hydrogen modified by minor portions of carbon dioxide and water vapor.

13. The method of claim 11 wherein the transition metal oxide is prepared in the presence of an alkali metal carbonate to form an alkali-metal, transition-metal oxygenate.

14. The method of claim 11 wherein the transition metal oxide is reacted with an alkali metal carbonate in the presence of a reducing fuel gas to form an alkali-metal, transition-metal oxygenate of non-stoichiometric proportions.

15. The method of claim 14 wherein an oxide or hydroxide of iron is reacted with lithium carbonate to form a non-stoichiometric variant of $LiFeO_2$ and said $LiFeO_2$ is consolidated into an anode member in the presence of a reducing gas including a major portion of $H_2$, a minor portion of $CO_2$ and at least 5 mol % $H_2O$ vapor.

16. The method of claim 15 wherein said reaction is conducted at a temperature of 650°–750° C. over a period of 50–100 hours.

* * * * *